Dec. 1, 1964   W. A. ANDERSON   3,159,194
NUT CRACKING DEVICE
Filed Aug. 13, 1962
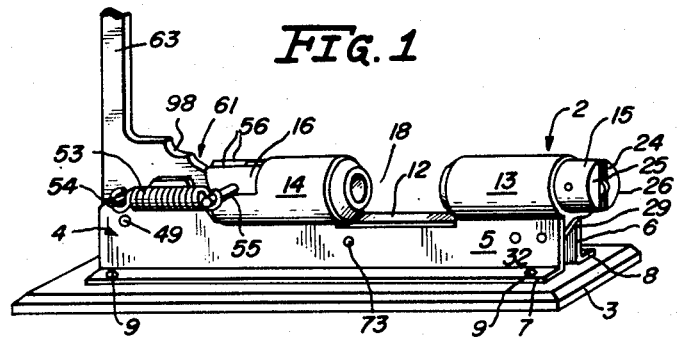
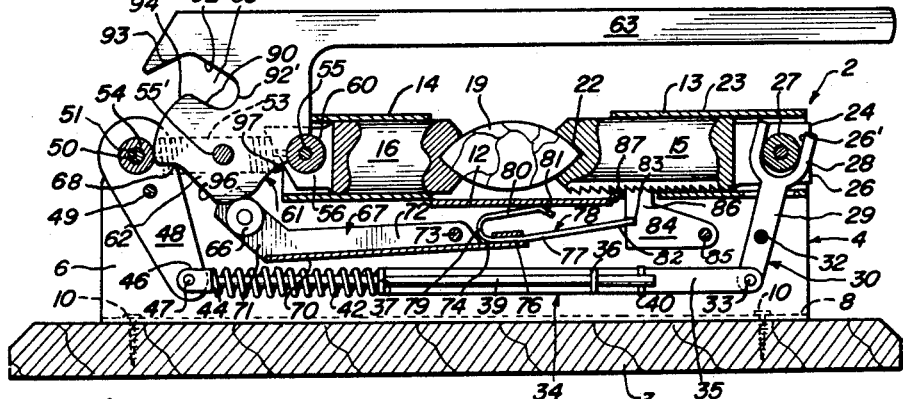
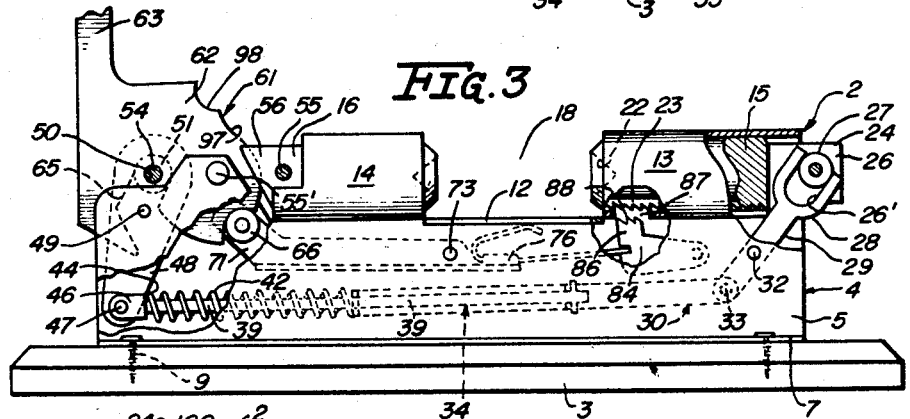
INVENTOR.
Walter A. Anderson
BY
John J. Kowalik
Atty.

United States Patent Office 3,159,194
Patented Dec. 1, 1964

3,159,194
NUT CRACKING DEVICE
Walter A. Anderson, 683 Stage Ave., Memphis 7, Tenn.
Filed Aug. 13, 1962, Ser. No. 216,377
6 Claims. (Cl. 146—16)

This invention relates to a device for cracking the shells of various kinds of nuts.

A general object of the invention is to provide a novel nut cracker which automatically selects the pressure to be applied sufficient to rupture the shell without crushing the meat.

A more specific object of the invention is to devise a novel nut cracker comprising a pair of nut-grasping jaws which are initially advanced toward each other under yielding pressure sufficient to tightly embrace the nut and wherein the jaws thereafter advance only a predetermined distance sufficient to break the shell.

The invention comprehends the provision of a novel self-adjusting nut-engaging jaw structure including a pair of opposed jaw elements, and a jaw-actuating cam means which also actuates a jaw-locking dog attendant to the jaws engaging the nut therebetween under predetermined pressure.

A further object of the invention is to provide a simple, rugged and efficient nut cracker which will operate trouble-free and may be used in the ordinary household.

These and further objects and advantages inherent in and encompassed by the invention will become more readily apparent from the specification and the drawings, wherein:

FIGURE 1 is a perspective view of the novel invention;

FIGURE 2 is a longitudinal sectional view of the nut cracker illustrating the cracking operation;

FIGURE 3 is a longitudinal sectional view similar to FIGURE 2 illustrating the open position of the parts; and FIGURE 4 is a fragmentary side elevational view partly broken away illustrating a different embodiment of the invention.

DESCRIPTION OF FIGURES 1-3

Describing the invention in detail and having particular reference to the drawings, there is shown a nut cracker generally designated 2 comprising a base 3 which supports a housing 4.

The housing 4 comprises a pair of upright longitudinal side walls 5 and 6 which at their lower ends are formed with outturned flanges 7 and 8 seated on the base 3 and secured thereto as by screws 9 and 10. The upper edges of the walls 5 and 6 are interconnected intermediate their ends by a top wall 12 and at opposite ends are fashioned to provide tubular holders 13 and 14 for the jaw elements 15 and 16 which are reciprocal toward and away from each other and provide a bite space 18 therebetween permitting the insertion of a nut 19 therein.

The jaw member 15 is preferably, though not necessarily, of cylindrical shape having a nut receiving pocket 22 at one end and being serrated at its lower side with a longitudinal plurality or row of depending teeth 23. The outer distal end 24 of jaw 15 is bifurcated and between the furcations 25, 26 supports a pin and roller assembly 27 which enter the slot 26' in the upper end of 28 of a lever 29 of actuating linkage 30. The lever 29 is pivoted intermediate its ends in a pivot pin 32 mounted on the walls 5 and 6. The lower end of lever 29 is pivoted at 33 to one end of a yieldable rod assembly 34 which comprises the strap portion 35 with a pair of longitudinally spaced apertured abutments 36 and 37 which admit one end portion of a telescoping rod 39 therethrough, rod 39 having a stop 40 mounted at one end which engages the outer side of stop 36. The abutment 37 seats one end of a compression spring 42 which biases the rod assembly 34 to extended position through abutment of the spring 42 at its other end against a seat 44 on the other end of rod 39 whereat rod 39 is provided with a jaw 46 which is pivoted at 47 to the lower end of a cam lever 48, said lever being pivoted intermediate its ends as at 49 to the walls 5 and 6 and rotatably carrying as at 50 its upper end a cam roller 51. It will be noted that rod assembly 39 extends from adjacent one end of the housing to adjacent the other and that the levers 29 and 48 operate conjunctively through the yieldable linkage 34 which in addition to being extended by spring 42 is pulled leftwardly as shown in the drawings, by spring means 53 which at one end is hooked to pin 54 of roller assembly 51 and at the other end to an anchor pin 55 which is connected to the furcations 56 at the outer end of jaw member 16 which is biased to separated position with respect to jaw 15.

Outward movement of jaw 16 is limited by abutment of cam roller 60 carried on pin 55 and the cam profile generally designated 61 of the cam portion 62 on the handle or actuator 63.

The cam portion 62 is so constructed that in the open position of the jaws the cam roller 51 on lever 48 is entered into a slot 65 which is at one side of the axis of rotation (pin 55') of the cam 62 and a cam roller 66 of a locking dog actuator 67 is entered into a notch 68 at one end of the cam profile 61 while the handle 63 is in upright position. In this position the dog actuator 67 is unlocked in that the lever 70 which at one upturned end portion 71 rotatably mounts the roller 66 has its input arm 72 canted downwardly about the axis or pin 73 where it is supported intermediate its ends from walls 5 and 6 intermediate the ends of the base. The lever 70 has an output arm 74 which is fabricated to provide a socket 76 supporting and admitting therethrough one leg 77 of a U-shaped combination spring and extender 78. The bight portion 79 of the extender is turned upwardly and merges into a diagonally upwardly directed reaction leg 80 which has an upper end portion 81 bent to provide a smooth bearing against the underside of the wall 12 of the housing. Leg 80 biases the lever 70 into engaged position of roller 66 with the cam profile 61 and disengages dog 84.

The leg 77 has its distal end 82 operatively or flexibly connected as at 83 to the dog 84 which is pivoted at 85 outwardly from point 83 to the housing walls 5 and 6 and adapted to swing vertically. In this version the dog or locking means 84 has an upwardly directed toothed portion 86 which is adapted to be moved from unlatched to latching position through a slot 87 in the housing wall 12 to engage its teeth 88 with the teeth 23 for holding the jaw portion 15 from retracting from the bite 18.

The cam profile 61 for purposes of clarity shall be termed the front cam profile and the cam surface 90 shall be termed the back cam profile. The surface 90 forms one side of the slot 65 which has an upper end surface 92' and an opposed guide surface 92 which at its free end is curved at 93 generally concentric with the cam edge surface 94 at the bottom end of the cam portion 62. The cam surface 94 is farther from the axis of rotation (55') than surface 90 with which it merges and thus causes the lever 48 through roller 51 to rotate in a counterclockwise direction and the linkage 34 to move rightwardly thus rotating lever 29 counterclockwise and thus advancing the plunger or jaw 15 toward jaw 16. The linkage 34 and cam 62 are so arranged that within the yield of the linkage, the dog operating linkage 67 is moved to jaw-locking position by the roller 66 withdrawing from notch 68 and riding on the lower cam profile portion 96 which is farther from the axis 55' than the notch surface 68. This action raises the dog 84 to lock with the teeth 23. It will be seen from the drawings that the upper cam profile portion 97 recedes from the jaw roller 60 of jaw element or plunger 16. The surface portion 97 is arranged to compensate for the movement of the surface 97, toward the roller 60 as the handle is swung downwardly until the locking dog is in locked position whereupon the surface 97 moves toward jaw 16 urging it toward jaw 15 a predetermined distance sufficient to rupture the shell of the nut without crushing the meat. Movement of the handle is continued until roller 60 enters the notch 98 at the upper end of cam surface 97. To open the jaws the handle is rotated in a counterclockwise direction and the parts move reversely from that described in closing.

EMBODIMENT OF FIGURE 4

In the embodiment of FIGURE 4 it will be noted that essentially the structure is identical with that previously described and therefore corresponding reference numerals are applied to identify the same parts.

In the instant structure the lever 29a is pivoted at 32 on one end of a swing link 100 which in turn is pivoted at its other end on the pin 85 which mounts the locking dog 84a. The upper end of lever 29a is pivotally connected by a pin 27a to the jaw 15.

Having described several embodiments of the invention, it will be readily apparent that various modifications will be suggested to those skilled in the art and therefore the foregoing descriptions are intended merely as suggestive and not in any way limiting of the invention except as set forth in the appended claims.

I claim:

1. In a nut cracker, a housing having a pair of opposed jaw holders, jaws in respective holders movable relative to each other and defining a nut-receiving bite therebetween, an output lever mounted on the housing and connected to one jaw, handle-actuated cam means rotatably mounted on the housing and having first, second and third cam segments, an input lever mounted on the housing in actuatable relation with said first cam segment, a yieldable telescopic linkage operatively interconnecting said levers for conjunctive movement, a locking dog mounted on the housing and movable to engaged and disengaged positions with respect to said one jaw, an actuator for the dog mounted on the housing and having an input end engaging said second cam segment and having a reaction end connected with said dog, and abutment means on the other jaw engageable with said third cam segment.

2. In a nut cracker, a housing having a bottom base, a pair of upright laterally spaced walls extending from the base and a pair of longitudinally spaced jaw holders connected to said walls along their upper edges and defining a nut-receiving bite, reciprocal jaws disposed in respective holders for closing and opening the bite, a pair of levers supported at opposite ends of the housing between said walls for swinging movement about generally horizontal axes, means connecting one end of one of the levers with the adjacent jaw for reciprocating the same, a yieldable link structure extending between said levers for translating movement between said levers, a latching dog pivotally supported between said walls beneath one of said jaws, said dog and one jaw having engageable releasable locking means, a lever element pivoted between said walls intermediate the ends of the housing and having a connection with said dog at one end, cam means rotatably supported between said walls at one end of the housing and having cam segments operative respectively of said other lever, said lever element and said other jaw.

3. The invention according to claim 5 and said cam segments formed and arranged to sequentially actuate said other lever, said lever element and said other jaw.

4. The invention according to claim 2 and said connection between said lever element and said dog being flexible.

5. The invention according to claim 2 and said cam segments being circumferentially spaced from one another and sequentially operative in closing the jaws to actuate said other lever and thus moving said one jaw, then moving the lever element for urging the dog to latched position with the one jaw, and then moving the other jaw toward said one jaw while said one jaw is locked.

6. In a nut cracker, a support, oppositely movable jaws mounted on the support and defining a nut-receiving bite therebetween, a first lever mounted on the support and operative of one jaw, actuating means mounted on the support, a second lever mounted on the support and actuatable by the actuating means, a yieldable linkage operatively interconnecting said levers for conjunctive movement, locking means mounted on the support and movable to engaged and disengaged positions with respect to said one jaw, an actuator operatively disposed between said actuating means and said locking means, and means on the other jaw disposed in position for operation by said actuating means to move said other jaw toward said one jaw subsequent to actuation of said one jaw toward the other jaw by said actuating means through said levers and yieldable linkage and further actuation by said actuating means of said locking means through said actuator to the locked position with respect to said one jaw.

References Cited by the Examiner
UNITED STATES PATENTS

| 1,192,846 | 8/16 | Boyer | 146—16 |
| 2,157,501 | 5/39 | Settle | 146—13 |
| 2,267,499 | 12/41 | Freidag | 146—16 |
| 2,543,886 | 3/51 | Brookey | 146—16 |

J. SPENCER OVERHOLSER, *Primary Examiner.*